US008353444B2

(12) United States Patent
Pietruska et al.

(10) Patent No.: US 8,353,444 B2
(45) Date of Patent: Jan. 15, 2013

(54) LOW TEMPERATURE DIFFUSION BRAZE REPAIR OF SINGLE CRYSTAL COMPONENTS

(75) Inventors: Norman Pietruska, Durham, CT (US); Beth Kwiatkowski Abriles, Madison, CT (US); John F. Falkowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 1745 days.

(21) Appl. No.: 11/262,252

(22) Filed: Oct. 28, 2005

(65) Prior Publication Data

US 2007/0102483 A1    May 10, 2007

(51) Int. Cl.
 B23K 31/02   (2006.01)
 B32B 15/00   (2006.01)
(52) U.S. Cl. ............... 228/119; 228/56.3; 228/262.3; 228/262.31; 148/528; 148/555; 148/562; 75/255
(58) Field of Classification Search .......... 228/119, 228/56.3, 262.3, 262.31; 148/528, 555, 562; 75/255
See application file for complete search history.

(56) References Cited

U.S. PATENT DOCUMENTS

| 5,127,969 A * | 7/1992 | Sekhar .................. 148/23 |
| 5,240,491 A | 8/1993 | Budinger et al. |
| 5,523,170 A | 6/1996 | Budinger et al. |
| 5,666,643 A * | 9/1997 | Chesnes et al. ........... 428/549 |
| 5,783,318 A * | 7/1998 | Biondo et al. ............. 428/680 |
| 5,806,751 A | 9/1998 | Schaefer et al. |
| 6,454,885 B1 * | 9/2002 | Chesnes et al. ............ 148/528 |
| 6,503,349 B2 * | 1/2003 | Pietruska et al. .......... 148/562 |
| 6,629,368 B2 * | 10/2003 | Schnell et al. ............. 29/889.1 |
| 6,968,991 B2 * | 11/2005 | Renteria et al. ........... 228/262.3 |
| 7,279,229 B2 * | 10/2007 | Budinger et al. ........... 428/557 |
| 2005/0067061 A1 * | 3/2005 | Huang et al. .............. 148/428 |

FOREIGN PATENT DOCUMENTS

| EP | 1226896 | 7/2002 |
| EP | 1258312 | 11/2002 |
| JP | 10137976 A | 5/1998 |
| JP | 2005500908 T | 1/2005 |
| WO | WO 89/03264 | 4/1989 |
| WO | WO 01/64964 | 9/2001 |
| WO | WO 02/50323 | 6/2002 |
| WO | WO 03/025237 | 3/2003 |
| WO | WO 2004/004953 | 1/2004 |
| WO | WO 2005/054528 | 6/2005 |

* cited by examiner

Primary Examiner — Devang R Patel
(74) Attorney, Agent, or Firm — Bachman & LaPointe, P.C.

(57) ABSTRACT

The present invention is directed to a process for repairing cracks in a turbine engine component. The process comprises the steps of providing a component, preferably formed from a single crystal nickel based material, with at least one crack, applying a repair alloy composition containing a single crystal nickel based alloy, a first nickel based braze alloy and a second nickel based braze alloy to the crack(s), and subjecting the component with the applied repair alloy composition to a thermal cycle to diffuse the repair alloy composition into the crack(s).

10 Claims, 1 Drawing Sheet

LOW TEMPERATURE DIFFUSION BRAZE REPAIR OF SINGLE CRYSTAL COMPONENTS

BACKGROUND OF THE INVENTION

Field of the Invention

Figure 1:
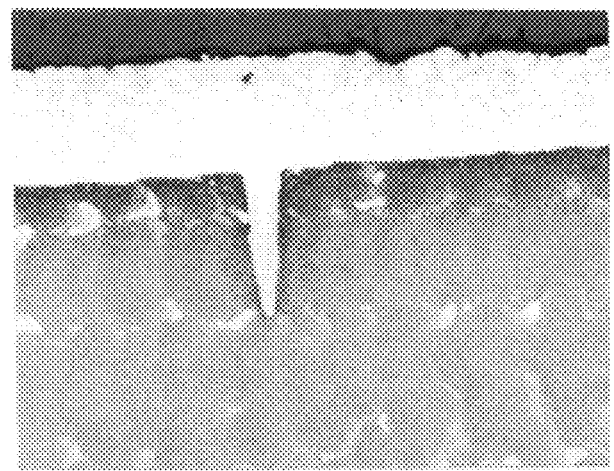

The present invention relates to a method for repairing turbine engine components formed from a single crystal material and to a repair alloy composition used to effect said repairs.

Turbine engine components, such as high pressure and low pressure turbine blades, are often formed from a single crystal material such as a single crystal nickel-based superalloy. In use, these components will develop cracks which require repair. Currently, some repair techniques expose the components being repaired to temperatures of 2200 degrees Fahrenheit. Such exposures may produce a debit in 1600 degree Fahrenheit creep strength which is unacceptable.

A repair technique which does not adversely affect material properties would be highly desirable.

SUMMARY OF THE INVENTION

The present invention provides a repair technique was developed which does not adversely affect material properties.

In accordance with the present invention, a process for repairing turbine engine components broadly comprises the steps of providing a component with at least one crack, applying a repair alloy composition containing a single crystal nickel based alloy, a first nickel based braze alloy, and a second nickel based braze alloy to the crack(s), and subjecting the component with the applied repair alloy composition to a heat treatment to diffuse the repair alloy composition into the crack(s).

Further in accordance with the present invention, a repair alloy composition for use in repairing cracks is provided. The repair alloy composition broadly comprises a single crystal nickel based material, a first nickel based braze alloy, and a second nickel based braze alloy.

Other details of the low temperature diffusion braze repair of single crystal components of the present invention, as well as other objects and advantages attendant thereto, are set forth in the following detailed description and the following drawing.

BRIEF DESCRIPTION OF THE DRAWING(S)

Figure 2:

FIG. 1 is a photomicrograph showing a repair effected in accordance with the process of the present invention; and FIG. 2 is an enlarged version of the repair shown in FIG. 1.

DETAILED DESCRIPTION OF THE PREFERRED EMBODIMENT(S)

A process for repairing turbine engine components having at least one crack without adversely affecting material properties is provided by the present invention. The process may be used to repair turbine engine components formed from nickel-based superalloys, particularly those formed as a single crystal. Typical nickel-based superalloys which may be used for the components include, but are not limited to, those nickel base alloys having from 5 to 10 wt % chromium, from 5 to 10 wt % cobalt, from 5 to 6.2 wt % aluminum, up to 1.9 wt % molybdenum, from 4 to 6 wt % tungsten, from 8 to 12 wt % tantalum, up to 0.35 wt % hafnium, up to 3.0 wt % rhenium, and the balance nickel.

The process of the present invention utilizes a repair alloy comprised of three components. The three components are a single crystal nickel based material, a first nickel based braze alloy, and a second nickel based braze alloy. The single crystal nickel based material may be present in an amount from 5 to 50 wt %. The first nickel based braze alloy may be present in an amount from 40 to 60 wt %. The second nickel based braze alloy may be present in an amount from 10 to 35 wt %. The single crystal nickel based material and the first nickel based braze alloy additions provide alloy additions which are beneficial to the material forming the turbine engine component. The second nickel based braze alloy preferably allows the alloy mixture to melt in the 2025 degree Fahrenheit range. The three components may be mixed using any suitable means known in the art to form the repair alloy composition.

The single crystal nickel based material preferably comprises a single crystal nickel based alloy having a composition consisting of from 5 to 10 wt % chromium, from 5 to 10 wt % cobalt, from 1.5 to 3.5 wt % titanium, from 4.2 to 6.2 wt % aluminum, up to 1.9 wt % molybdenum, from 4 to 6 wt % tungsten, from 4.8 to 12 wt % tantalum, up to 0.5 wt % columbium, up to 0.35 wt % hafnium, up to 0.004 wt % boron, up to 3.0 wt % rhenium, up to 0.013 wt % yttrium, and the balance nickel.

The first nickel based braze alloy may be a braze alloy sold under the trade name DF-4B. This braze alloy has a composition consisting of 14 wt % chromium, 10 wt % cobalt, 3.5 wt % aluminum, 2.5 wt % tantalum, 2.75 wt % boron, 0.1 wt % yttrium, and the balance nickel. Other nickel based braze alloys may be used provided that the nickel content is greater than 50 wt %.

The second nickel based braze alloy may be a braze alloy sold under the trade name Nicobraz 150. This braze alloy has a composition consisting of 14.75 wt % chromium, less than 0.06 wt % carbon, 3.63 wt % boron, less than 1.5 wt % iron, and the balance nickel. Other nickel based braze alloys may be used provided that the nickel content is greater than 50 wt %.

After preparation of the repair alloy has been completed, the repair alloy formed from the three components may be applied to each crack in the component being repaired. The repair alloy may be applied to the crack(s) using any suitable technique known in the art.

After the repair alloy has been applied to the crack(s), the component is subjected to a thermal cycle which does not adversely affect the properties of the material forming the component. The thermal cycle comprises heating the component with the repair alloy applied to the crack(s) to a melt cycle temperature in the range of from 1950 to 2065° F., preferably from 2000 to 2050° F., for a time period such as 15 minutes, and then cooling the component with the applied repair alloy to a diffusion cycle temperature in the range of from 1950 to 2025° F., preferably from 1975 to 2025° F., and maintaining the temperature for a total time period in the range of from 5 to 20 hours, preferably from 8 to 12 hours, to effect the repair of the crack(s). The thermal cycle may be performed in a furnace at a vacuum of $5 \times 10^{-4}$ Torr or lower. After the thermal cycle has been completed, the repaired component may be cooled at a rate of 35° F./minute or faster.

It has been found that cracks, when repaired with the braze alloy mixture of the present invention and exposed to the thermal cycle, yield a well filled, isothermally solidified structure.

Referring now to FIGS. 1 and 2, there is illustrated a repair made in accordance with the present invention. As can be seen from this figure, a well filled, isothermally solidified structure is formed. The repair shown in the figures was made by removing all coatings from the component being repaired. The crack in the component was cleaned. Thereafter, a repair alloy consisting of 60 wt % DF-4B, 35 wt % Nicobraz 150, and 5 wt % of a nickel based single crystal alloy having a composition consisting of 5 wt % chromium, 10 wt % cobalt, 5.65 wt % aluminum, 1.9 wt % molybdenum, 5.9 wt % tungsten, 8.4 wt % tantalum, 0.10 wt % hafnium, 3.0 wt % rhenium, 0.013 wt % yttrium, and the balance nickel was applied over the crack. The component with the repair alloy was placed in a furnace and heat treated in a vacuum of $5 \times 10^{-4}$ Torr at a temperature in the range of 2010 to 2040° F. for 15 minutes. The component with the repair alloy was then cooled to 2000° F. and held at temperature for 9 hours and 45 minutes. The repaired component was then cooled at a rate of 35° F./minute or faster.

A repair on a single crystal nickel based alloy component may also be made by removing all coatings from the component being repaired and cleaning the crack to be repaired. A repair alloy consisting of 50 wt % DF-4B, 25 wt % Nicobraz 150, and 25 wt % of a nickel based single crystal alloy having a composition consisting of 5 wt % chromium, 10 wt % cobalt, 5.65 wt % aluminum, 1.9 wt % molybdenum, 5.9 wt % tungsten, 8.4 wt % tantalum, 0.10 wt % hafnium, 3.0 wt % rhenium, 0.013 wt % yttrium, and the balance nickel was prepared and applied over the crack. The component with the repair alloy may be placed in a furnace and heat treated in a vacuum of $5 \times 10^{-4}$ Torr at a temperature in the range of 2035 to 2065° F. for 15 minutes. The component and the repair alloy may then be cooled to 1975° F. and held at temperature for 9 hours and 45 minutes. The repaired component may then be cooled at a rate of 35° F./minute or faster.

It is apparent that there has been provided in accordance with the present invention a low temperature diffusion braze repair of single crystal components which fully satisfies the objects, means, and advantages set forth hereinbefore. While the present invention has been described in the context of specific embodiments thereof, other unforeseeable alternatives, modifications, and variations may become apparent to those skilled in the art having read the foregoing description. Accordingly, it is intended to embrace those alternatives, modifications, and variations as fall within the broad scope of the appended claims.

What is claimed is:

1. A process for repairing cracks in a component, said process comprising the steps of:
   providing a component with at least one crack;
   applying a repair alloy composition consisting of from 5 to 50 wt % of a single crystal nickel based material, from 40 to 60 wt % of a first nickel based braze alloy, and from 10 to 35 wt % of a second nickel based braze alloy to the at least one crack; and
   subjecting said component with said repair alloy composition to a thermal cycle to diffuse the braze alloy composition into said at least one crack and repair said component.

2. The process according to claim 1, wherein said component providing step comprises providing a component formed from a single crystal nickel based alloy.

3. The process according to claim 1, wherein said component providing step comprises providing a component formed from a single crystal nickel based alloy having a composition containing from 5 to 10 wt % chromium, from 5 to 10 wt % cobalt, from 5 to 6.2 wt % aluminum, up to 1.9 wt % molybdenum, from 4 to 6 wt % tungsten, from 8 to 12 wt % tantalum, up to 0.35 wt % hafnium, up to 3.0 wt % rhenium, and the balance nickel.

4. The process according to claim 1, wherein said repair alloy composition applying step comprises applying a repair alloy containing a single crystal nickel based material consisting of from 5 to 10 wt % chromium, from 5 to 10 wt % cobalt, from 1.5 to 3.5 wt % titanium, from 4.2 to 6.2 wt % aluminum, up to 1.9 wt % molybdenum, from 4 to 6 wt % tungsten, from 4.8 to 12 wt % tantalum, up to 0.5 wt % columbium, up to 0.35 wt % hafnium, up to 0.004 wt % boron, up to 3.0 wt % rhenium, up to 0.013 wt % yttrium, and the balance nickel, a first nickel based braze alloy consisting of 14 wt % chromium, 10 wt % cobalt, 3.5 wt % aluminum, 2.5 wt % tantalum, 2.75 wt % boron, 0.1 wt% yttrium, and the balance nickel, and a second nickel based braze alloy consisting of 14.75 wt% chromium, less than 0.05 wt % carbon, 3.63 wt % boron, less than 1.5 wt % iron and the balance nickel.

5. The process according to claim 1, wherein said subjecting step comprises placing said component with said applied repair alloy composition into a furnace;
   heating said component with said applied repair alloy composition to a temperature in the range of from 1950 to 2065° F. for a desired time period; cooling said component with said applied repair alloy composition to a temperature in the range of from 1950 to 2025° F. for a time period in the range of from 5 to 20 hours.

6. The process according to claim 5, applying a vacuum of $5 \times 10^{-4}$ Torr or lower during said subjecting step.

7. The process according to claim 5, further comprising cooling said repair component.

8. The process according to claim 7, wherein said cooling step comprises cooling said repair component at a rate of 35° F./ minute.

9. The process according to claim 7, wherein said cooling step comprises cooling said repair component at a rate faster than 35° F/minute.

10. The process according to claim 1, wherein said component providing step comprises providing a component formed from a single crystal nickel based alloy having a composition consisting of from 5 to 10 wt % chromium, from 5 to 10 wt % cobalt, from 5 to 6.2 wt % aluminum, up to 1.9 wt % molybdenum, from 4 to 6 wt % tungsten, from 8 to 12 wt % tantalum, up to 0.35 wt % hafnium, up to 3.0 wt % rhenium, and the balance nickel.

* * * * *